United States Patent Office 3,351,447
Patented Nov. 7, 1967

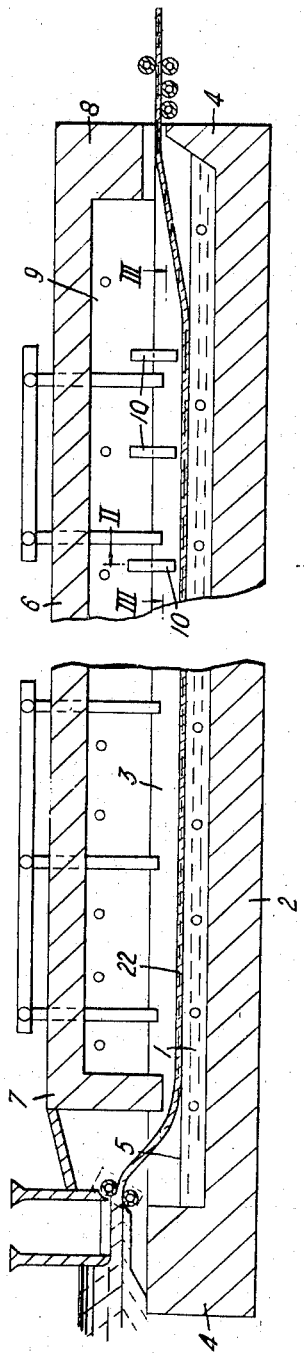

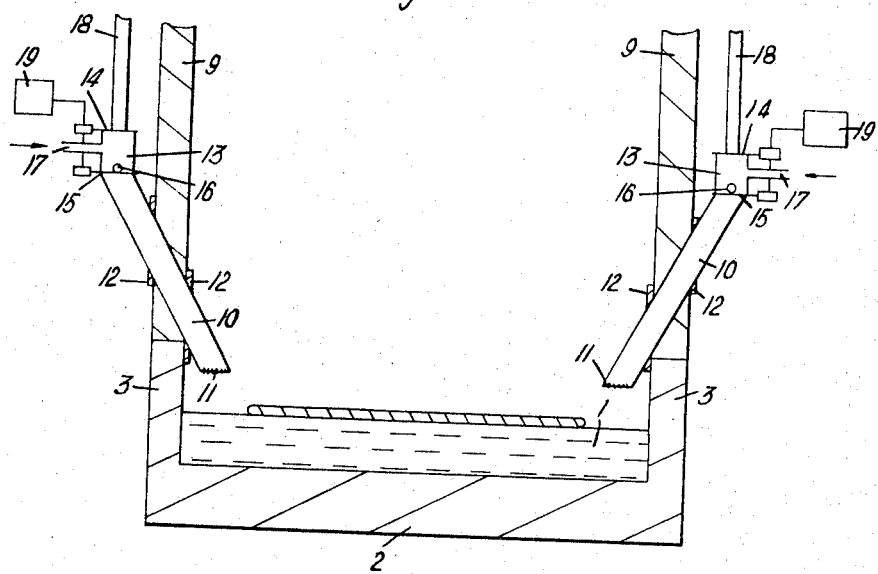
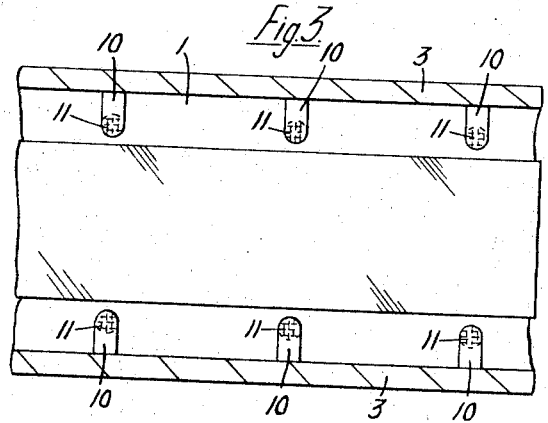

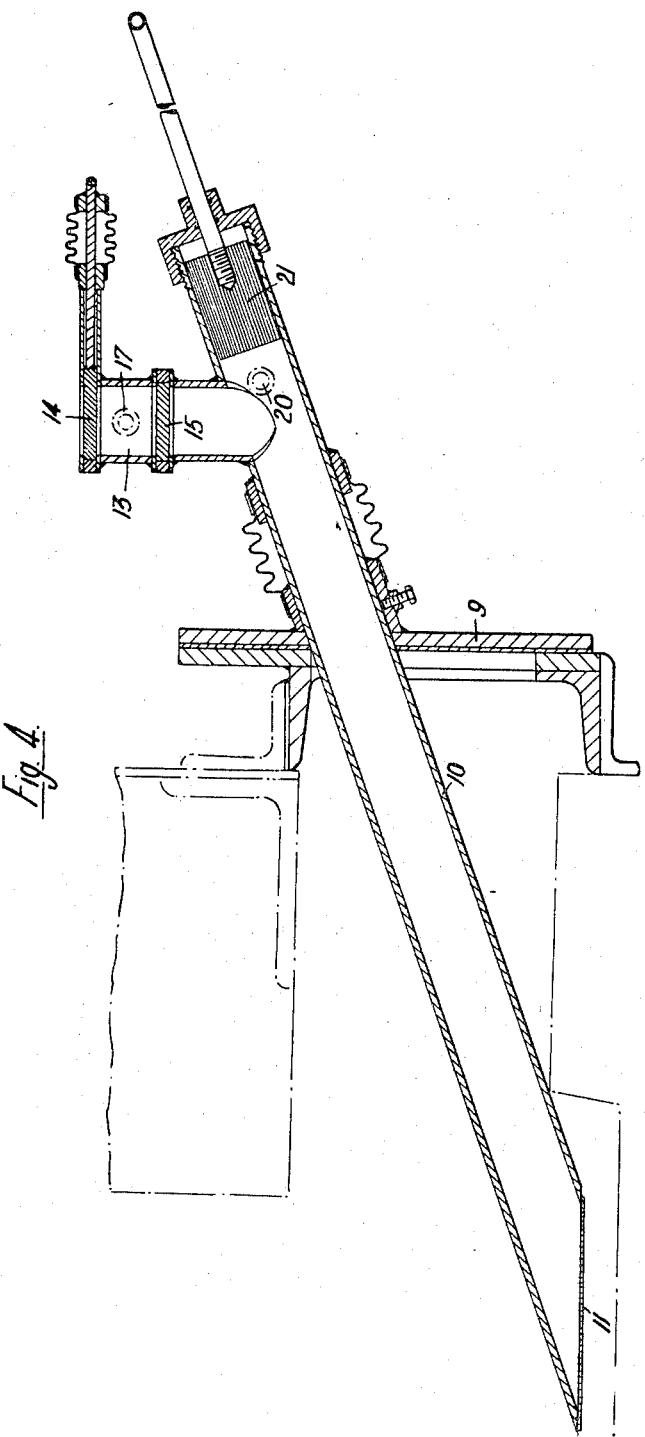

3,351,447
METHOD AND APPARATUS FOR THE MANUFACTURE OF FLAT GLASS ON A MOLTEN METAL BATH
Jack Lawrenson, St. Helens, England, assignor to Pilkington Brothers Limited, Liverpool, England, a corporation of Great Britain
Filed Aug. 11, 1964, Ser. No. 388,810
Claims priority, application Great Britain, Aug. 15, 1963, 32,360/63
8 Claims. (Cl. 65—65)

ABSTRACT OF THE DISCLOSURE

In the manufacture of flat glass in ribbon form on a molten metal bath, the feeding to the bath of an additive element—with which an impurity in the bath preferentially reacts—by supporting pellets of the additive element adjacent the surface of the bath long enough to melt the pellets and allow the additive element to run into the bath.

---

This invention relates to the manufacture of flat glass, and also to the treatment of flat glass.

In the manufacture or treatment of flat glass during which glass is in contact with a molten metal, for example a method in which flat glass is manufactured in ribbon form on a bath of molten tin or tin alloy having a specific gravity greater than glass, an additive element may be incorporated in the molten metal. As an example of one such process reference is made to United States Patent No. 3,305,337 in which an additive element, usually a metal, is used as a protection to the molten metal in addition to a plenum of protective atmosphere which is maintained over the molten metal.

It is a main object of the present invention to provide an improved method of treating or manufacturing flat glass during which the glass is in contact with a molten metal containing an additive element.

According to the present invention the additive element is fed into the molten metal with which the glass is in contact so that the additive element will mix directly into the molten metal, by introducing the additive element into the molten metal in a liquid form.

The present invention provides a process in which flat glass is in contact with molten metal, the step of introducing into the molten metal an additive element in liquid form.

More particularly the present invention provides in the manufacture of flat glass during which glass is in contact with molten metal the step of feeding an additive element into the molten metal by permitting a liquid containing the additive element to fall into the molten metal.

Advantageously the additive element is a metal which is brought into proximity with the molten metal and is in a form, for example an alloy, in which it may be caused to melt by the heat of the molten metal, and according to this aspect the present invention provides in the manufacture of flat glass during which glass is in contact with molten metal, feeding an additive metal into the molten metal by supporting a pellet comprising the additive metal above the surface of said molten metal and in proximity thereto so that the pellet melts and the additive metal in a liquid form falls into the molten metal.

In one embodiment of the invention in which glass is advanced in ribbon form over a bath of molten metal, the pellet is conveniently supported above the surface of the molten metal and in proximity thereto on a mesh, for example a stainless steel grid, so that as the pellet melts, the additive metal in a liquid form falls through the mesh into the molten metal bath.

The molten metal with which the glass is in contact, for example the molten metal comprising the bath in the particular embodiment of the invention just mentioned, is such as to have all the characteristics as fully described in U.S. Patent Nos. 2,911,759 and 3,083,551 for the molten bath. Preferably the molten metal is tin and advantageously the additive metal is then fed into the molten metal as a liquid tin alloy, for example the pellet may comprise 95% tin and 5% by weight of the additive metal. In this way an additive metal having a melting point higher than the temperature of the molten metal may be introduced into the molten metal in a liquid form without any heating other than that obtained from its presence in proximity to the molten metal. In cases where the additive metal has a comparatively low melting point, that is to say below the temperature of the headspace over the molten metal, the pellet may consist entirely of the additive metal.

For additionally protecting the molten metal, it is desirable that the additive metal which is introduced into the molten metal shall be a metal with which an impurity in the molten metal preferentially reacts.

According to this aspect, therefore, the present invention provides in the manufacture of flat glass in ribbon form during which the glass is supported on a bath of molten metal, maintaining in the bath at least a trace of an additive metal with which an impurity in the bath preferentially reacts, thereby controlling the migration of said molten metal into the underface of the ribbon as the ribbon is advanced along the bath, by feeding an additive metal into the molten metal by supporting a pellet comprising the additive metal above the surface of said molten metal and in proximity thereto so that the pellet melts and the additive metal in a liquid form falls into the molten metal.

More particularly according to this aspect the present invention provides in the manufacture of flat glass in ribbon form during which the glass is supported on a bath of molten metal, maintaining in the bath at least a trace of an additive metal with which oxygen or sulfur present as an impurity in the bath preferentially reacts as set forth in said Patent 3,305,337, thereby controlling the migration of said molten metal into the underface of the ribbon as the ribbon is advanced along the bath by feeding an additive metal into the molten metal by supporting a pellet comprising the additive metal above the surface of said molten metal and in proximity thereto so that the pellet melts and the additive metal in a liquid form falls into the molten metal and removing from the bath reaction products which are formed by reaction of the additive metal with an impurity in the bath.

Examples of additive metals which may be used in accordance with the present invention are magnesium, lithium and zinc, although it will be understood that many other additive metals may be incorporated into the molten metal by the method of the present invention, either as pure metals or in the form of metal alloys which may be alloys either of the metal which is the molten metal of the bath, or of another metal which is more noble than the molten metal of the bath. In the case when the bath is molten tin, the more noble metal with which the additive metal is alloyed may be copper, for example.

According to another feature, the present invention comprehends apparatus for use in the manufacture of flat glass during which glass is advanced in ribbon form along a bath of molten metal, comprising an elongated tank structure containing the bath of molten metal, means for feeding glass on to the bath and advancing the glass in ribbon form along the bath towards an outlet in the tank structure, and at least one tube extending through the tank structure above the bath and terminating in proximity to the bath surface, said tube being terminated by a wire mesh so that a pellet comprising additive metal introduced into the tube is supported on the wire mesh as the pellet melts and falls in a liquid form into the bath of molten metal.

Advantageously there are provided a plurality of said tubes equispaced from one another near the outlet end of the tank structure and on both sides thereof.

Conveniently the tube further comprises a plunger of a non-wetting material for assisting the movement of the pellet down the tube and onto the wire mesh.

The invention also comprehends flat glass produced by a method according to the invention during which the glass is in contact with a molten metal. The surface concentration in such glass of the metal which constitutes the molten metal does not exceed a pre-determined value.

In particular when glass is in contact with molten tin, flat glass produced according to the invention is characterised in that the surface concentration of tin in the glass is considerably reduced as compared with flat glass produced in contact with molten metal protected only by a substantially non-oxidising atmosphere.

The invention further comprehends a sheet of glass cut from flat glass of the kind having the above characteristics.

In order that the invention may be more clearly understood a preferred embodiment thereof will be described, by way of example with reference to the accompanying drawings in which:

FIGURE 1 is a sectional elevation of apparatus according to the invention comprising a tank structure containing a bath of molten metal, a roof structure over the tank structure and apparatus for delivering a rolled ribbon of glass at a controlled rate onto the bath surface, FIGURE 2 is an enlarged view of part of the apparatus of FIGURE 1, taken along the lines II—II, FIGURE 3 is a plan view of part of the apparatus of FIGURE 1, taken along the lines III—III, and FIGURE 4 is a sectional view of an alternative arrangement to that shown in FIGURE 2.

In the drawings, like reference numerals designate the same or similar parts.

Referring to the drawings, there is shown a tank structure which contains a bath 1 of molten metal, for example molten tin or a molten tin alloy having a specific gravity greater than glass. The tank comprises a floor 2, side walls 3 and end walls 4. The side walls 3 and end walls 4 are integral with each other and with the floor 2. The level of the surface of the bath 1 of molten metal is indicated at 5, and there is shown a glass ribbon 22 being introduced onto the surface of the bath 1 and removed therefrom after treatment, for example by the process of U.S. Patent No. 3,083,551.

The tank structure supports a roof structure bridging the bath and including a roof 6, end walls 7 and 8 and side walls 9, so that the roof structure provides a tunnel over the bath 1 and defines a headspace over the bath. Passing through the side walls 9 near the colder or outlet end of the bath are stainless steel tubes 10. As may be more clearly seen in FIGURE 2 of the accompanying drawings, the stainles teel tubes 10 extend at an angle so that their lower ends are above the surface 5 of the molten metal, but in proximity thereto, for example the lower ends of the tubes 10 may be about 3" above the surface 5 of the bath.

Included in the lower end of each of the tubes 10 is a stainless steel mesh or grid 11, and the stainless steel grid is therefore, in the example quoted above, 3" above the surface of the molten metal comprising the bath.

Where the tubes 10 pass through the side walls 9 of the roof structure gas seals 12 are provided so that no gas may enter the headspace over the bath at this point. A plenum of protective atmosphere is maintained in the headspace over the bath.

At the upper end of the tubes 10 outside the roof structure there are provided introduction chambers 13 for the additive metal in solid form. The introduction chambers include two valves 14 and 15, each of which may permit the passage of a pellet or marble 16 which comprises the additive metal. Additionally gas inlet means 17 introduces a protective atmosphere into the introduction chamber 13.

The pellets 16 are fed to the introduction chamber from a store 18 and the introduction of the pellets 16 is controlled by automatic means 19 which operate the valves 14 and 15 to introduce one pellet at a time first into the chamber 13 and then through the lower valve 15, when the upper valve 14 is closed, into the tube 10.

The pellet, which comprises 95% tin and 5% magnesium for example, then rolls down the tube 10 and comes to rest on the grid 11. As the pellet rests on the grid 11 it is heated by the heat from the molten metal which is at a temperature of the order of 700° C. so that the pellet melts and the molten alloy of tin and magnesium drips through the grid 11 into the molten bath of tin as a liquid stream. The magnesium is thus introduced into the molten metal as a liquid which readily mixes with the molten tin.

In the event of any tin oxide or magnesium oxide being present in the pellet which is fed down the tube 10 it is found that this oxide is retained on the stainless steel grid 11 after the liquid additive metal has entered the molten metal of the bath. Advantageously the grid 11 is periodically cleaned to remove the oxide which remains thereon.

In order to minimise the quantity of oxide which may be present on the pellet, the tube 10 may be chilled in order to decrease the tendency to oxidation of the pellet during its passage down the tube 10, should any trace of free or combined oxygen be present in the tube 10.

As may be seen from FIGURE 3 of the accompanying drawings, three tubes 10 are provided on either side of the glass ribbon on the bath 1 at the colder end of the bath. A circulation of the molten metal of the bath is engendered by the friction between the glass ribbon and the molten metal of the bath and by convection currents, and this circulation distributes the magnesium adequately throughout the bath to effect additional protection of the molten metal of the bath. However, the additive metal may be introduced into the bath at the hotter end either additionally to the introduction at the colder end, or alternatively thereto.

By use of the automatic means 19 on the respective tubes 10 a controlled rate of feed of the additive metal, i.e. magnesium, into the molten metal comprising the bath may be achieved in order to maintain a desired level of magnesium, for example 10 parts per million, in the bath. Furthermore by the use of the present invention, the additive metal is enabled to be introduced into the molten metal in a very short transit time through the heated parts within the tank and roof structures.

Referring now to FIGURE 4 there is shown an alternative arrangement to that shown in FIGURE 2 for introducing the additive metal. The tube 10 of stainless steel which is shown in FIGURE 4 is inclined at a similar angle to the horizontal and similarly includes a stainless steel grid or mesh 11 at its lower end. In FIGURE 4 the valves 14 and 15 shown are sliding valves, but alternatively quick operating lever catch valves may be used instead, the important requirement of the valves being that they must be gas-tight when shut.

In addition to the protective atmosphere being pumped into the introduction chamber 13 through gas inlet means 17, the protective atmosphere is also introduced via gas inlet means 20 into the interior of the tube 10.

Indicated at the upper end of the tube 10 in FIGURE 4 is a carbon plunger 21 having a diameter very slightly less than the diameter of the tube 10. This plunger is arranged to be operated immediately after the valve 15 has been opened to allow a pellet to enter the tube 10 and the plunger 21 assists the natural gravitational force in moving the pellet or liquid derived therefrom as the pellet melts down to the lower end of the tube 10 and onto the stainless steel mesh or grid 11 from which the additive metal in liquid form drips into the molten metal.

Instead of using pellets in the form of marbles, cylindrical pellets comprising an additive metal may be employed.

By the use of the apparatus described, it is found that oxides which may be present in the pellet itself or may be formed on the pellet in the tube 10 by reaction with either oxygen or water are retained either on the walls of the tube 10 or on the stainless steel grid 11. These oxides may be either tin oxides or oxides of the additive metal itself.

The preferred method according to the invention also has the advantage that the alloy is melted at a low temperature and the formation of excessive oxide is thereby prevented.

By the use of the invention as described, the ribbon of glass taken from the bath has a surface brightness at least equal to that obtained by "fire finish" treatment, which is a characteristic of glass which has been in contact with a molten metal surface.

I claim:

1. Apparatus for use in the manufacture of flat glass during which glass is advanced in ribbon form along a bath of molten metal, comprising an elongated tank structure containing the bath of molten metal, means for feeding glass on to the bath and advancing the glass in ribbon form along the bath towards an outlet in the tank structure, and at least one tube extending through the tank structure above the bath and terminating in proximity to the bath surface, said tube being terminated by a wire mesh so that a pellet comprising additive metal introduced into the tube is supported on the wire mesh as the pellet melts and falls in a liquid form into the bath of molten metal.

2. Apparatus according to claim 1, comprising a plurality of said tubes equispaced from one another near the outlet end of the tank structure and on both sides thereof.

3. Apparatus according to claim 1, further including a plunger of a non-wetting material in the tube for assisting the movement of the pellet down the tube and onto the wire mesh.

4. In the manufacture of flat glass during which glass is in contact with a molten metal surface, feeding into the molten metal an additive element with which oxygen and sulphur present in the molten metal react in preference to reaction with the molten metal, by supporting unmelted material comprising said additive element adjacent the molten metal surface for a time sufficient to permit the material to melt and run into the molten metal.

5. A method of manufacturing flat glass in which glass is advanced in ribbon form along a bath of molten metal, feeding into the molten metal an additive element with which oxygen and sulphur present in the molten metal react in preference to reaction with the molten metal, by supporting a pellet comprising said additive element adjacent the surface of the molten metal bath for a time sufficient to permit the pellet to melt and the additive element to run into the molten metal bath.

6. A method according to claim 5, wherein the bath is a bath of molten tin and the pellets are formed from an alloy of tin and the additive element.

7. A method according to claim 5, wherein the additive element is a member of the group consisting of magnesium, lithium and zinc.

8. Apparatus according to claim 1, wherein the wire mesh is a stainless steel grid.

References Cited

UNITED STATES PATENTS 2,754,559   7/1956   Fromson _____ 65—65

DONALL H. SYLVESTER, *Primary Examiner.*

A. D. KELLOGG, *Assistant Examiner.*